US006728187B2

(12) United States Patent
Diaz et al.

(10) Patent No.: US 6,728,187 B2
(45) Date of Patent: Apr. 27, 2004

(54) LIGHT PIPE ASSEMBLY FOR AN OPTICAL DRIVE

(75) Inventors: Elizabeth B. Diaz, Woodside, CA (US); Peter K. Lee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 09/875,128

(22) Filed: Jun. 7, 2001

(65) Prior Publication Data

US 2002/0186638 A1 Dec. 12, 2002

(51) Int. Cl.[7] ............................................... G11B 33/02
(52) U.S. Cl. ........................................................ 369/75.1
(58) Field of Search ................................ 369/75.1–75.2, 369/77.1–77.2; 361/685; 385/123, 115, 92

(56) References Cited

U.S. PATENT DOCUMENTS

| 5,425,124 A | * | 6/1995 | McRight et al. ............. 385/123 |
| 5,548,676 A | * | 8/1996 | Savage, Jr. .................... 385/92 |
| 6,064,569 A | * | 5/2000 | Sands et al. ................. 361/685 |

* cited by examiner

*Primary Examiner*—Allen Cao

(57) ABSTRACT

The present invention is directed to an optical light pipe assembly for an optical drive which can accommodate optical drives from various manufacturers. The light pipe assembly is particularly useful in a tower configuration computer case. Advantageously, various optical drives, such as CD ROMs, DVDs, DVD-ROMs, CDRWs, DVDRWs, etc. can be purchased from different manufacturers having different LED locations yet the optical drive can be covered but the light emitted by the LED is visible.

18 Claims, 4 Drawing Sheets

LIGHT PIPE ASSEMBLY FOR AN OPTICAL DRIVE

RELATED APPLICATION

The present application is related to co-pending patent application U.S. Pat. Ser. No. 09/875,206 entitled "DOOR ASSEMBLY FOR AN OPTICAL DRIVE", filed on even date herewith and assigned to the instant assignee and which is hereby incorporated by reference into this specification in its entirety.

FIELD OF THE INVENTION

The present invention relates generally to computers and, more particularly, to a light pipe assembly for a tower computer case.

BACKGROUND OF THE INVENTION

Personal computers are becoming fashion accessories and have also been getting smaller. Consistent with this trend, most personal computers sold today are in a tower configuration with as much of the exterior as possible covered in colored plastic. Due to compelling industrial design on a PC, it is desirable to cover up as much of the exterior as possible to create "a clean" appearance. However, optical components such as CD-ROMs, DVDs, DVD ROMs, CDRWs or DVDRWs are usually available only in beige. To create the clean appearance, it is necessary to also cover the optical components.

However, there are pricing pressures on components that go into a computer. Thus, the new tower computers having plastic exterior covers must be able to incorporate components purchased from different suppliers because of technological change or pricing pressures. For example, optical drives, such as CD-ROMs and DVDs may be purchased from many different component vendors because of price or because one supplier has a superior product. Yet, each supplier may have placed the LED in different locations which can make it difficult to cover the optical drive yet still allow the LED to emit light. The LED on the optical drive needs to still be seen by the user, but each drive may have an LED in a different location. Thus, there is a need in the art to design a bezel or a cover for the optical drive so that the front of the optical drive is hidden but the LED is visible by a user.

SUMMARY OF THE INVENTION

It is an object of the invention to be able to cover an optical drive yet still have the LED on the optical drive visible to a user during operation of the optical drive.

It is another object of the present invention to allow a computer manufacturer to be able to purchase optical drives from various manufacturers, cover the optical drive and still have the LED on the optical drive visible to a user during operation of the optical drive.

The present invention is directed to an optical light pipe assembly for an optical drive which can accommodate optical drives from various manufacturers. The light pipe assembly is particularly useful in a tower configuration computer case. Advantageously, various optical drives, such as CDROM, DVD, DVD-ROM, CDRW or DVDRW, etc. can be purchased from different manufacturers having different LED locations yet the optical drive can be covered but the light emitted by the LED is visible to a user.

These and other objects of the present invention are achieved by a light pipe assembly for an optical drive which has an LED and an actuating button. The optical drive has a closed position and an open position. The light pipe assembly is mountable in a computer case and has a slot through which the optical drive extends when in the open and actuating position. An elongated light pipe is positioned proximate the LED. An actuating assembly is movable between a normal position not in contact with the actuating button and an actuating position in contact with the actuating button to cause the optical drive to change from one of the open position and the closed position to another one of the open position and the closed position.

The foregoing and other objects of the present invention include a computer case with an optical drive which has an open position and a closed position. The optical drive has an LED and an actuating button. The computer case has a slot through which the optical drive extends when in the open position and the computer case has an actuating opening. An elongated light pipe is positioned to proximate the LED. An actuating assembly is movable between a normal position not in contact with the actuating button and an actuating position in contact with the actuating button to cause the optical drive to change from one of the open position and the closed position to another one of the open position and the closed position.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 2B is a schematic view of the button beam actuator;

BEST MODE FOR CARRYING OUT THE INVENTION

Figure 1:
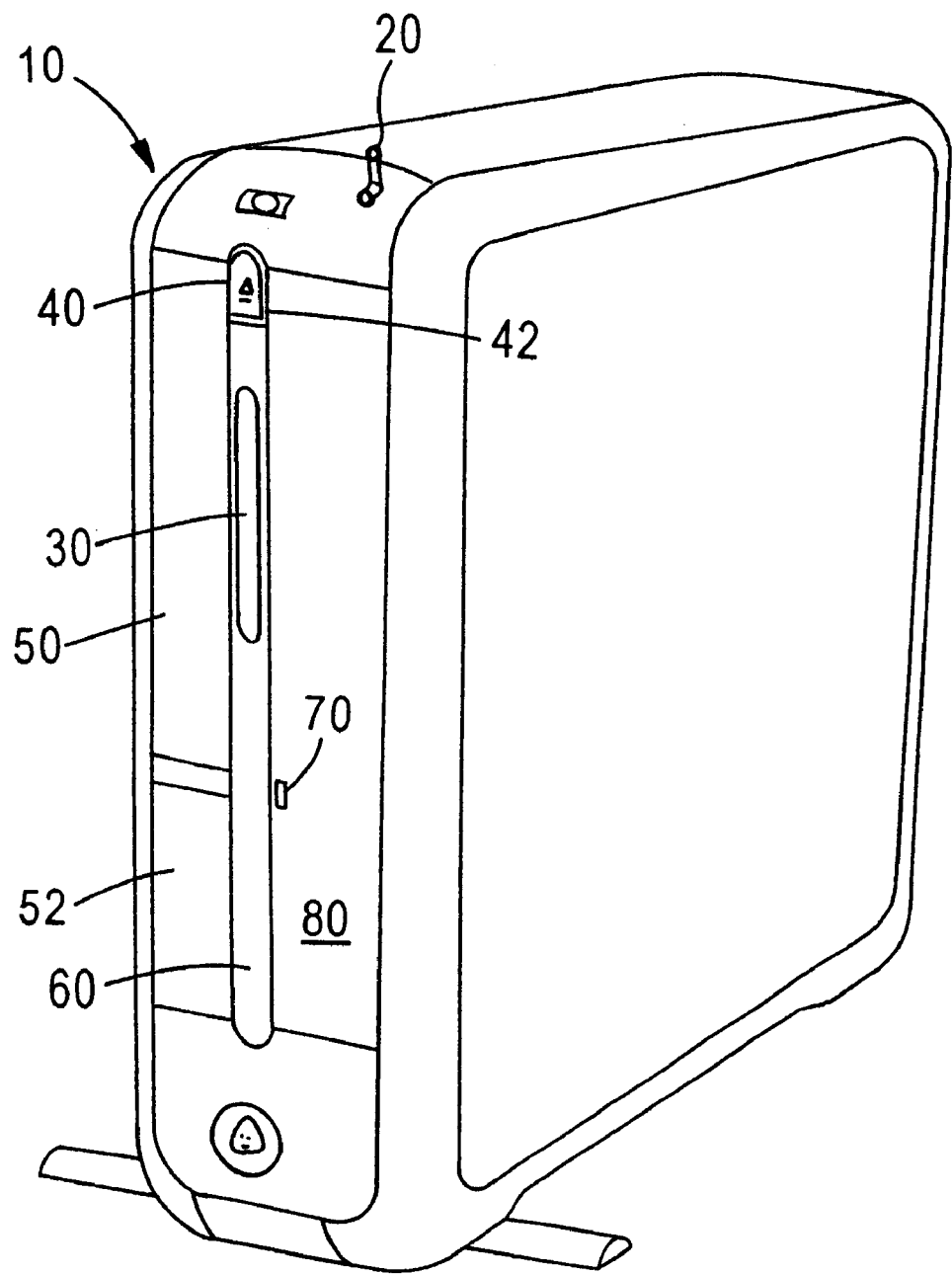
FIG. 1 is a perspective view of a computer case including a light pipe assembly according to the present invention.

Refer first to FIG. 1 where a tower computer case, generally indicated at 10 is illustrated. It should be understood that terms such as "left", "right", "above" and "below" are used for convenience only and are to be construed in the relative sense. The tower computer case 10 includes a central portion 20 which includes a vertically extending clear LED light pipe 30. LED light pipe 30 extends for a minority of the height of the case 10. As depicted in FIG. 1, an actuator button 40 is located in an actuator button opening 42 and is positioned above the LED light pipe 30 in the top portion 20 for actuating an optical drive as explained in detail below. The LED light pipe 30 is centered within a center cosmetic trim 60.

Figure 2:
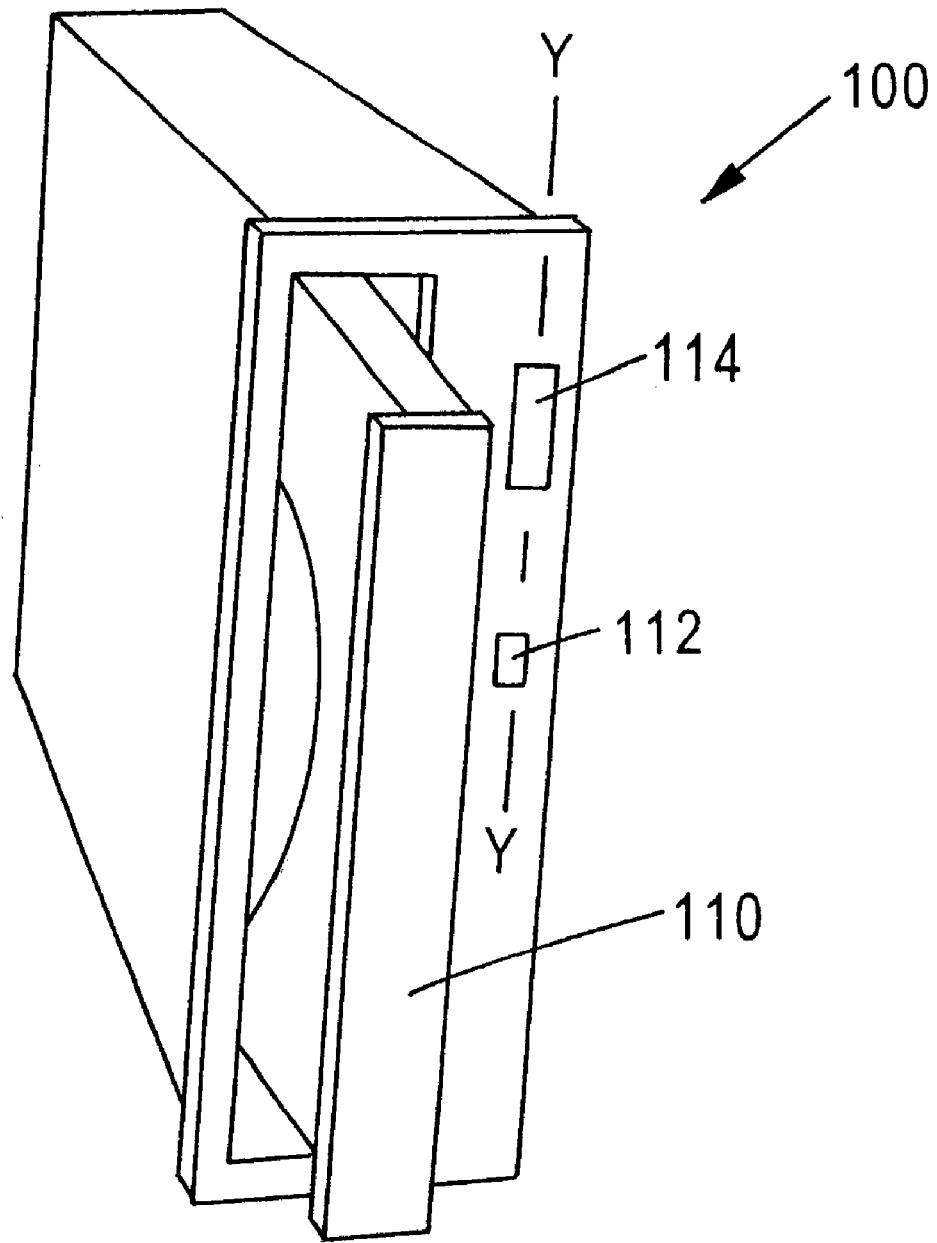
FIG. 2 is a perspective view of a prior art optical drive.

FIG. 2 is an illustration of a prior art optical disc drive 100, such as a CD ROM, DVD, DVD-ROM, CDRW or DVDRW. The CD ROM drive 100 includes a CD tray 110 having an open position and a closed position, an LED 112 and an actuating button 114. The LED 112 and the actuating button 114 are aligned along line Y—Y in FIG. 2. The illustrated CD ROM drive 100 operates in a known manner.

Figure 3A:
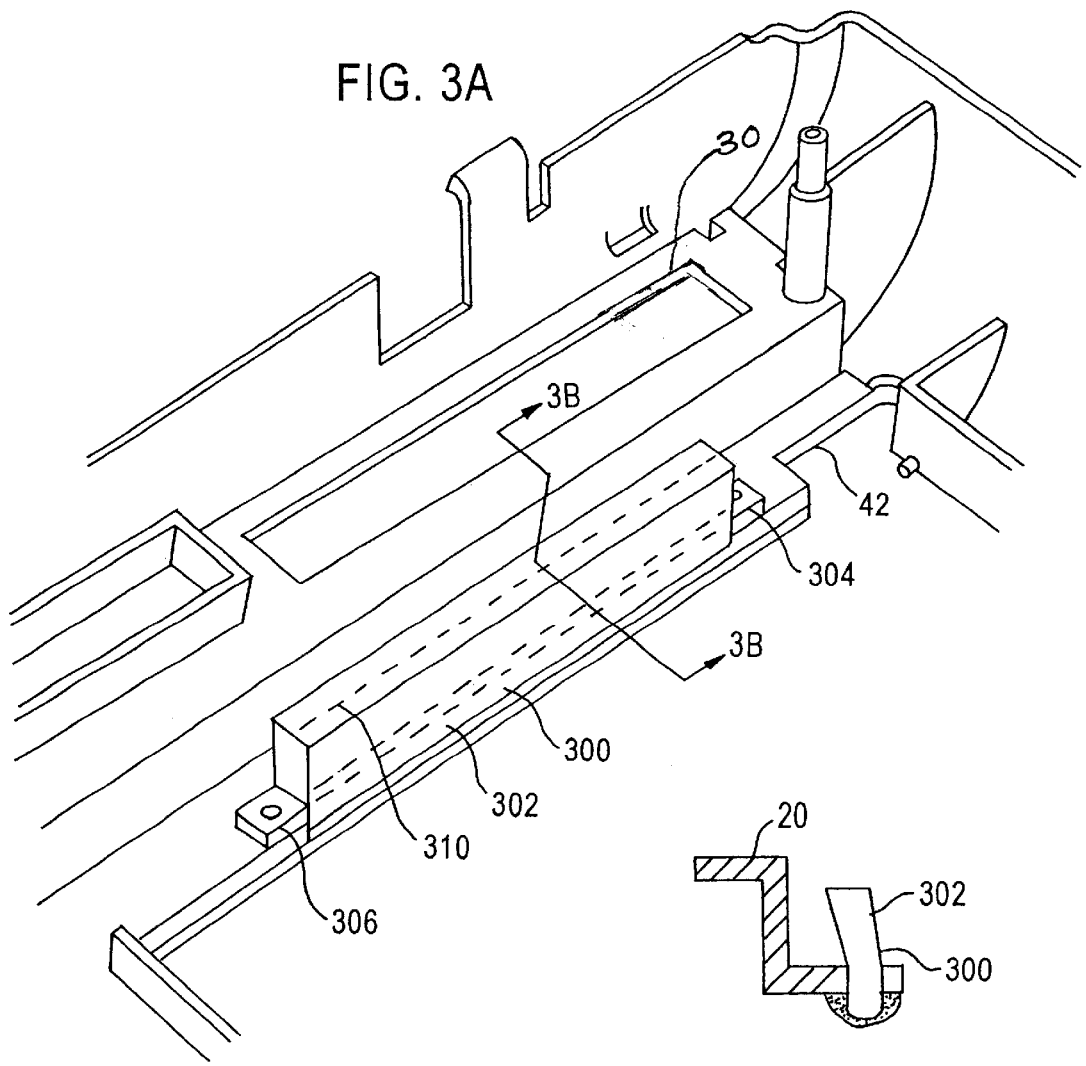
FIG. 3A is a rear perspective view of the optical light pipe according to the present invention.
Figure 3B:
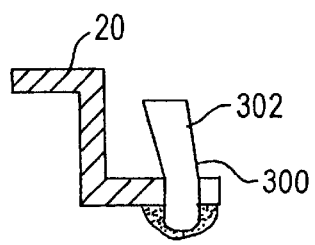
FIG. 3B is a cross-sectional view taken along lines 3B—3B in FIG. 3A.

Refer now to FIG. 3A which depicts an inside rear view of the central portion 20 of the computer case. In FIG. 3A a portion of the slot 30 is depicted. As previously mentioned, the CD ROM 100 has an open position where the CD tray 110 extends outwardly from the front of the tower computer case 10. Positioned within the slot 30 is an optical light pipe 300 formed of an optically clear material such as polycarbonate or acrylic. The optical light pipe 300 is attached to the central plastic portion 20 at opposite ends thereof using integral bosses 304, 306. A central portion 302 of the optical light pipe 300 has an exterior surface which is flush with an exterior surface of the central plastic portion 20. The optical light pipe 300 has a rear surface 310 which is proximate the LED 112 of the CD ROM drive 100. As depicted in FIGS. 3A and 3B the central portion 302 of the light pipe 300 projects rearwardly from the central portion 20 of the computer case 10 at an angle away from the slot 30 so as to minimize the light transmission.

Figures 4A, 4B:
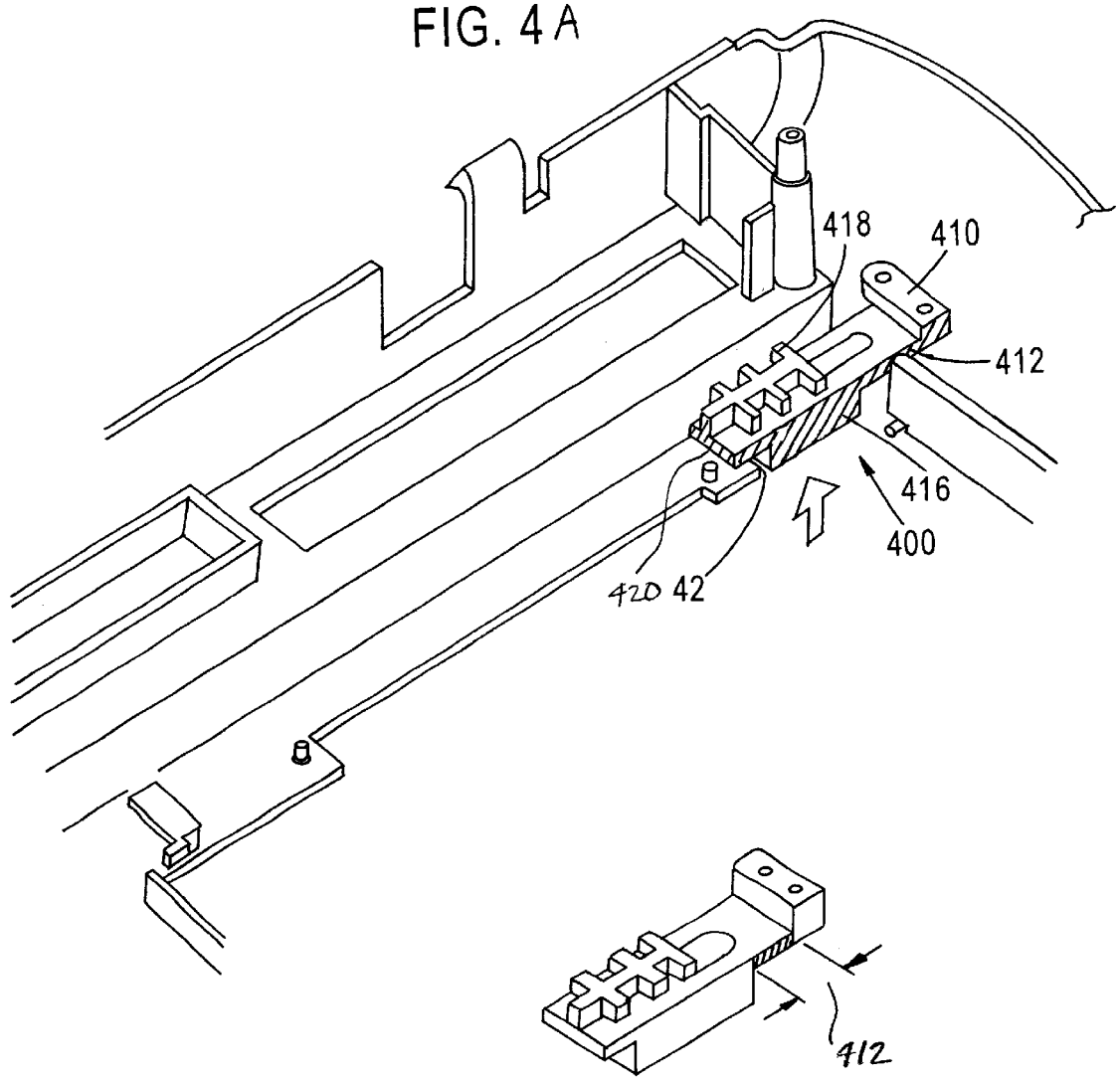
FIG. 4A is a rear perspective view of an actuator with the light pipe omitted according to the present invention.
FIG. 4B is a perspective view of the actuator emphasizing the beam hinge.

Refer now to FIG. 4A where the CD button beam actuator 400 is depicted. The CD button beam actuator 400 has a mounting portion 410, a hinge portion 412, a front bezel 416, a contact portion 418 and a stop portion 420. The mounting portion 410 is fixed to the computer case. A flexible beam portion 412 extends from the fixed mounting portion 410 and is cantilevered therefrom. The front bezel 416 extends outwardly beyond the computer case when the actuator 400 is in a normal position as depicted in FIG. 4. Normally, the hinge portion 412 biases the CD button beam actuator 400 in a downward direction as depicted in FIG. 4 and the stop portion 420 is in contact with the computer case in the normal position. When a user pushes the front bezel 416, then the stop portion is no longer in contact with the computer case. When the actuating portion 416 is pushed by a user in the direction shown by the arrow in FIG. 4, then the contact portion 418 is brought into contact with the actuating button 114 of the CD-ROM. The CD button beam actuator 400 is attached to the plastic case 20 at the mounting portion 410 using heat stick adjacent the actuator button opening 42. The actuator button opening 42 receives the actuating portion 416. In FIG. 1 the button is depicted as reference numeral 40 which corresponds to the front bezel 416.

FIG. 4B is an illustration emphasizing the flexible beam portion 412 disposed between the front bezel 416 and the mounting portion 410.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A light pipe assembly for an optical drive having an LED and an actuating button, the optical drive having a closed position and an open position, said light pipe assembly being mountable in a computer case having a slot through which the optical drive extends when in the open position and an actuating opening, comprising:
    an elongated light pipe extending across the computer case in a front portion thereof positioned proximate the LED; and
    an actuating assembly being movable between a normal position not in contact with the actuating button and an actuating position in contact with the actuating button to cause the optical drive to change from one of the open position and the closed position to another one of the open position and the closed position.

2. The light pipe assembly of claim 1, wherein the light pipe is made from one of an acrylic and a polycarbonate.

3. The light pipe assembly of claim 1, wherein the actuating assembly includes an actuating member having a flexible hinged portion, an actuating portion and a mounting portion, said flexible hinge portion being located between said actuating portion and said mounting portion, said mounting portion being attached to a computer case.

4. The light pipe assembly of claim 1, wherein said elongated light pipe is of sufficient length to accommodate various possible locations of the LED.

5. The light pipe assembly of claim 1, wherein said light pipe is positioned substantially parallel relative to said actuating assembly.

6. The light pipe assembly of claim 1, wherein said actuating assembly is mounted to a computer case.

7. The light pipe assembly of claim 1, wherein said actuating portion extends through the actuating open in the computer case.

8. The light pipe assembly of claim 1, wherein said actuating assembly is shorter than said light pipe.

9. The light pipe assembly of claim 3, wherein said actuating member is located within the computer case and the computer case has an opening where said light pipe has an exterior surface which is visible through the opening.

10. A computer system, comprising:
    a computer case including an optical drive having an open position and a closed position, said optical drive having an LED and an actuating button, said computer case having a slot through which said optical drive extends when in said open position and said computer case having an actuating opening;
    an elongated light pipe extending across the computer case in a front portion thereof positioned proximate the LED; and
    an actuating assembly being movable between a normal position not in contact with the actuating button and an actuating position in contact with the actuating button to cause the optical drive to change from one of the open position and the closed position to another one of the open position and the closed position.

11. The computer system of claim 10, wherein the light pipe is made from one of an acrylic and a polycarbonate.

12. The computer system of claim 10, wherein the actuating assembly includes an actuating member having a flexible hinged portion, an actuating portion and a mounting portion, said flexible hinge portion being located between said actuating portion and said mounting portion, said mounting portion being attached to a computer case.

13. The computer system of claim 10, wherein said elongated light pipe is of sufficient length to accommodate various possible locations of the LED.

14. The computer system of claim 10, wherein said light pipe is positioned substantially parallel relative to said actuating assembly.

15. The computer system of claim 10, wherein said actuating assembly is mounted to a computer case.

16. The computer system of claim 10, wherein said actuating portion extends through the actuating open in the computer case.

17. The computer system of claim 10, wherein said actuating assembly is shorter than said light pipe.

18. The computer system of claim 10, wherein said actuating member is located within the computer case and the computer case has an opening where said light pipe has an exterior surface which is visible through the opening.

* * * * *